ial acid, such as hydrochloric acid.

3,536,713
N-(HYDROXY-CYCLOHEXYL)-AMINOBENZYL-AMINES AND THE SALTS THEREOF

Johannes Keck, Biberach (Riss), Friedrich-Wilhelm Koss, Misburg, Eckhard Schraven, Frankfurt am Main, and Gerwin Beisenherz, Biberach (Riss), Germany, assignors to Boehringer Ingelheim G.m.b.H., Ingelheim am Rhein, Germany, a corporation of Germany
No Drawing. Filed May 10, 1967, Ser. No. 637,351
Claims priority, application Germany, May 10, 1966, T 31,134
Int. Cl. C07c 87/28; C07d 57/36
U.S. Cl. 260—253                                    6 Claims

ABSTRACT OF THE DISCLOSURE

The compounds are N-(hydroxy-cyclohexyl)-aminobenzylamines useful as antipyretics, secretolytics and antitussives.

---

This invention relates to novel N-(hydroxy-cyclohexyl)-aminobenzylamines and acid addition salts thereof, as well as to various methods of preparing these compounds.

More particularly, the present invention relates to compounds of the formula

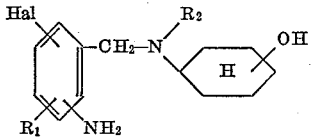

(I)

wherein
$R_1$ is hydrogen, chlorine or bromine,
$R_2$ is hydrogen or methyl, and
Hal is chloride or bromine, and their non-toxic, pharmacologically acceptable acid addition salts.

The compounds of the present invention may be prepared by a number of different methods, among which the following have proved to be particularly convenient and efficient:

Method A

By brominating or chlorinating an N-(hydroxy-cyclohexyl)-aminobenzylamine of the formula

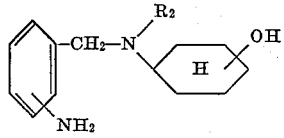

(II)

wherein $R_2$ has the same meanings as in Formula I, with bromine or chlorine. The halogenation reaction is carried out in the presence of glacial acetic acid or of an inert organic solvent, such as a halogenated hydrocarbon, and advantageously at a temperature between 20 and 100° C., preferably at room temperature, and if desired in the presence of a catalyst, such as iron. At least 2 mols of bromine or chlorine or a small excess thereover are used per mol of the N-(hydroxy-cyclohexyl)-aminobenzylamine of the Formula II. The reaction yields the hydrochloride or hydrobromide addition salt, respectively, of a compound of the Formula I wherein Hal and $R_1$ are both chlorine or bromine, depending upon whether chlorine or bromine was used as the halogenating agent. The particular raw acid addition salt thus produced may be isolated as such and may be purified by recrystallization from a suitable solvent. Alternatively, the raw acid addition salt may be purified by converting it into the free base in accordance with known methods, which may then be retransformed into any desired non-toxic acid addition salt including the hydrochloride or hydrobromide.

Method B

By reacting a hydroxy-cyclohexyl-amine of the formula

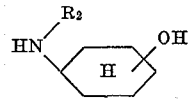

(III)

wherein $R_2$ has the same meanings as in Formula I, with a mono- or diacylamino-halo-benzylhalide of the formula

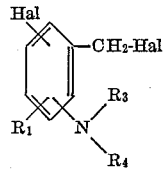

(IV)

wherein $R_1$ and Hal have the same meanings as in Formula I, $R_3$ is lower aliphatic or aromatic acyl and $R_4$ is hydrogen or lower aliphatic or aromatic acyl, and subsequently splitting off the acyl group or groups by conventional methods.

The reaction between compounds III and IV is carried out in the presence of a hydrogen halide-binding agent, that is, an agent capable of tying up or neutralizing the hydrogen halide released by the reaction. Examples of suitable such agents are inorganic bases and tertiary organic bases. However, an excess of the secondary amine III may also simultaneously serve as a hydrogen halide-binding agent; under these circumstances an excess of at least 1 mol of the amine III over and above the stoichiometric amount required for reaction with the benzylhalide IV must be provided per mol of compound IV.

The reaction is further advantageously carried out in the presence of an inert organic solvent, such as carbon tetrachloride, chloroform, ethanol, benzene or toluene. It proceeds particularly rapidly at elevated temperatures, especially at the boiling point of the particular solvent which is employed. In those cases where an excess of the amine III or a tertiary organic base is used as the hydrogen halide-binding agent, these may simultaneously serve as the solvent medium for the reaction; in other words, under these conditions no separate solvent needs to be added to the reaction mixture.

The removal of the protective acyl group or groups $R_3$ and $R_4$ may be accomplished, for instance, by heating the reaction product of the reaction between compounds III and IV with a dilute mineral acid or a dilute inorganic base.

Method C

By reducing an N-(hydroxy-cyclohexyl)-nitrobenzyl-amine of the formula

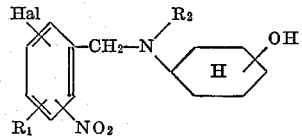

(V)

wherein $R_1$, $R_2$ and Hal have the same meanings as in Formula I. The reduction is carried out by customary procedures, for instance by catalytic reduction with hydrogen in the presence of a noble metal catalyst, such as platinum or palladium, and advantageously in the presence of an inert organic solvent, such as methanol, ethanol, tetrahydrofuran or dioxane. The reduction may also be carried out with the aid of a mixture of hydrazine hydrate and Raney nickel, preferably in the presence of an inert solvent, such as methanol. A compound of the Formula V may also be reduced into the corresponding aminobenzylamine of the Formula I with the aid of nascent hydrogen formed by iron, zinc or tin and a mineral acid. Finally, the reduction may also be carried out by any other known process for the conversion of an aromatic nitro compound into the corresponding aromatic amino compound.

Method D

By reducing an N-(hydroxy-cyclohexyl)-aminobenzamide of the formula

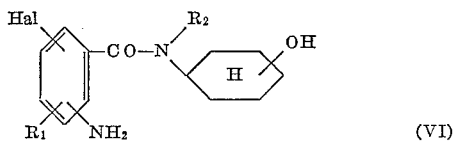

(VI)

wherein $R_1$, $R_2$ and Hal have the same meanings as in Formula I, with the aid of a complex metal hydride pursuant to known procedures. The best yields are obtained by reducing compound VI with lithium aluminum hydride. The reduction is advantageously carried out in the presence of an anhydrous inert organic solvent, such as tetrahydrofuran or ether, and at elevated temperatures, such as at the boiling point of the particular solvent which is employed. The reduction product is isolated from the reaction mixture by customary procedures.

The starting compounds of the Formulas II through VI required for methods A through D are either described in the literature or may be prepared by processes described in the prior art.

Thus, an N-(hydroxy-cyclohexyl)-aminobenzylamine of the Formula II may be prepared by reacting a nitrobenzyl halide with a secondary hydroxycyclohexyl-amine of the Formula III and subsequently reducing the nitro group in the reaction product into the amino group pursuant to method C.

A hydroxycyclohexyl-amine of the Formula III may, for example be prepared by hydrogenating a corresponding aminophenol, separating the cis-trans isomer mixture formed thereby, and if necessary methylating the isomers. An o-hydroxycyclohexyl-amine of the Formula III may be prepared from cyclohexeneoxide.

A diacylamino-halo-benzylhalide of the Formula IV may be prepared by reacting a 2- or 4-diacylamino-halotoluene with bromosuccinimide.

Similarly, an N - (hydroxy - cyclohexyl) - nitrobenzylamine of the Formula V may be prepared by brominating a 2- or 4-nitro-halotoluene with bromosuccinimide, and subsequently reacting the intermediate nitro-halo-benzylbromide with an amine of the Formula III.

Finally, an N-(hydroxy-cyclohexyl)-benzamide of the Formula VI may, for example, be prepared by halogenation pursuant to method A of a corresponding aminobenzamide which, in turn, may be obtained by procedures analogous to those described in the literature.

The compounds of the Formula I above are organic bases and therefore form water-soluble acid addition salts with one or two mol equivalents of an inorganic or organic acid. Such acid addition salts may be obtained pursuant to known procedures, such as by dissolving the desired acid in ethanol or another suitable solvent, and neutralizing the solution with an equivalent amount of the free base, or vice versa. Examples of non-toxic, pharmacologically acceptable acid addition salts include, but are not limited to, those formed with hydrochloric acid, hydrobromic acid, sulfuric acid, phosphoric acid, latic acid, citric acid, tartaric acid, maleic acid, 8-chlorotheophylline or the like.

In those instances where methods A through D yield a racemic mixture of a compound of the Formula I, this mixture may, if desired, be separated into its optically active antipodes in customary fashion, such as by fractional crystallization with optically active acids. Similarly, if the end product is a mixture of diastereomers, this mixture may, if desired, be separated into its diastereomer components by customary procedures, such as by chromatography.

The following examples further illustrate the present invention and will enable others skilled in the art to understand it more completely. It should be understood, however, that the instant invention is not limited solely to the particular example given below.

EXAMPLE 1

Preparation of N - (trans - p - hydroxy - cyclohexyl)-(2-amino - 3,5 - dibromo-benzyl)-amine and its hydrochloride by method A 6.5 gm. of N-(trans-p-hydroxy-cyclohexyl)-(2-aminobenzyl)-amine were dissolved in a mixture of 80 cc. of glacial acetic acid and 20 cc. of water, and then 9.6 gm. of bromine were added dropwise at room temperature while stirring the solution. After all of the bromine had been added, the reaction mixture was stirred for two hours more and was then concentrated in a water aspirator vacuum. The residue was taken up in 2 N ammonia, the solution was extracted several times with chloroform, and the organic extract solutions were combined and evaporated. The residue, raw N-(trans-p-hydroxy-cyclohexyl)-(2-amino-3,5-dibromo-benzyl)-amine, was purified with chloroform and ethyl acetate over silica gel in a chromatographic column, the purified product was dissolved in a mixture of ethanol and ether, and the solution was acidified with concentrated hydrochloric acid. The precipitate formed thereby was collected and recrystallized from ethanol and ether, yielding N-(trans-p-hydroxy-cyclohexyl)-(2-amino - 3,5 - dibromo - benzyl)-amine hydrochloride, M.P. 233–234.5° C. (decomposition), of the formula

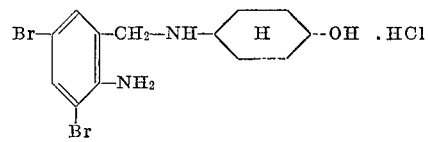

EXAMPLE 2

Preparation of N-(trans-p-hydroxy-cyclohexyl)-N-methyl-(2-amino-3,5-dibromo-benzyl)-amine and its hydrochloride by Method B 11.3 gm. of 2-diacetylamino-3,5-dibromo-benzyl bromide were dissolved in 200 cc. of carbon tetrachloride, 2.7 gm. of triethylamine and 3.4 gm. of trans-p-methyl-amino-cyclohexanol were added to the solution, and the mixture was refluxed for two hours. Thereafter, the reaction mixture was allowed to cool, the triethylammonium bromide precipitated thereby was separated by vacuum filtration, and the filtrate was evaporated. The residue was dissolved in a mixture 40 cc. of ethanol and 21 cc. of concentrated hydrochloric acid, and the solution was refluxed for 20 hours. Thereafter, the reaction solution was concentrated somewhat by evaporation, then made alkaline with dilute aqueous ammonia and extracted several times with chloroform. The chloroform extract solutions were combined, dried over sodium sulfate and evaporated. The residue, raw N - (trans-p-hydroxy-cyclohexyl)-N-methyl - (2-amino-3,5-dibromo-benzyl)-amine, was dissolved in ethanol, and the solution was acidified with concentrated hydrochloric acid. After addition of a small amount of ether to the acidified solution, a solid substance crystallized out, which was collected and recrystallized from a mixture of ethanol and ether. It was identified to be N - (trans-p-hydroxy-cyclohexyl)-N-methyl-(2-amino- 3,5-dibromo-benzyl)-amine hydrochloride, M.P. 216.5–217.5° C. (decomposition), of the formula

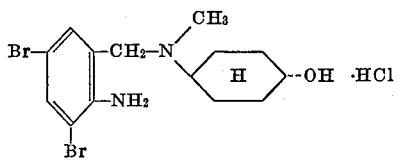

EXAMPLE 3

Preparation of N-(cis-m-hydroxy-cyclohexyl)-(4-amino-2-chloro-benzyl)-amine hydrochloride by Method C 11 gm. of N-(cis-m-hydroxy-cyclohexyl)-(2-chloro-4-nitro-benzyl)-amine hydrochloride were dissolved in a mixture of 150 cc. of methanol and 20 cc. of water, the solution was admixed with 0.1 gm. of platinum dioxide, and the mixture was reduced with hydrogen under a pressure of 5 atmospheres gauge at room temperature. After the calculated amount of hydrogen had been absorbed, the catalyst was filtered off, and the filtrate was diluted with a small amount of ether, whereby a precipitate was formed. The precipitate was collected and recrystallized from methanol; it was identified to be N-(cis-m-hydroxy-cyclohexyl)-(4-amino-2-chloro-benzyl)-amine hydrochloride, M.P. 208–209° C. (decomposition), of the formula

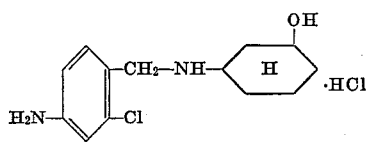

EXAMPLE 4

Preparation of N-(cis-m-hydroxy-cyclohexyl)-(2-amino-5-bromo-benzyl)-amine by Method D 38 gm. of lithium aluminum hydride were added to 3 liters of absolute tetrahydrofuran, and the mixture was slowly combined at room temperature with a solution of 122 gm. of 2 - amino-5-bromo-N-(cis-m-hydroxy-cyclohexyl)-benzamide in 0.5 liter of absolute tetrahydrofuran, accompanied by stirring After all of the benzamide solution had been added, the reaction mixture was refluxed for 20 hours while stirring. Thereafter, the unconsumed lithium aluminum hydride in the reaction mixture was decomposed by adding ethyl acetate, water and 5 N sodium hydroxide thereto, the mixture was filtered, and the organic phase of the filtrate was isolated and evaporated to dryness. The residue was taken up in benzene, whereby a small amount of the benzamide starting material initially precipitated out. The precipitate was filtered off, and the filtrate was diluted with benzene, whereby a solid substance crystallized out which was collected and recrystallized from benzene. It was identified to be N-(cis-m-hydroxy-cyclohexyl) - (2 - amino - 5-bromo-benzyl)-amine, M.P. 141–142.5° C., of the formula

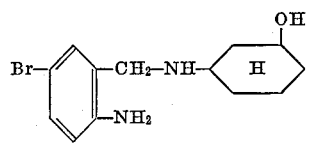

EXAMPLE 5

Using a procedure analogous to that described in Example 1, N-(trans-m-hydroxy-cyclohexyl)-(2 - amino-3,5-dibromo-benzyl)-amine was prepared by brominating N-(trans-m-hydroxy-cyclohexyl)-(2 - amino-benzyl)-amine. Its dihydrochloride had a melting point of 190–192° C. (decomposition).

EXAMPLE 6

Using a procedure analogous to that described in Example 1, N-(cis-m-hydroxy-cyclohexyl) - (2-amino-3,5-dibromo-benzyl)-amine was prepared by brominating N-(cis-m-hydroxy-cyclohexyl)-(2 - amino-benzyl)-amine. Its hydrochloride had a melting point of 200–202.5° C.

EXAMPLE 7

Using a procedure analogous to that described in Example 2, N-(trans-m-hydroxy-cyclohexyl)-N-methyl - (2-amino-3,5-dibromo-benzyl)-amine was prepared from 2-diacetylamino-3,5-dibromo-benzyl bromide and trans-m-methylaminocyclohexanol. Its hydrochloride had a melting point of 206.5–208.5° C. (decomposition).

EXAMPLE 8

Using a procedure analogous to that described in Example 2, N-(cis-m-hydroxy-cyclohexyl)-N-methyl - (2-amino-3,5-dibromo-benzyl)-amine was prepared from 2-diacetyl-amino - 3,5-dibromo-benzyl bromide and cis-m-methylaminocyclohexanol. Its hydrochloride had a melting point of 207–208° C. (decomposition).

EXAMPLE 9

Using a procedure analogous to that described in Example 2, N-(trans-o-hydroxy-cyclohexyl)-N-methyl - (2-amino-3,5-dibromo-benzyl)-amine was prepared from 2-diacetylamino - 3,5-dibromo-benzyl bromide and trans-o-methylamino-cyclohexanol. Its hydrochloride had a melting point of 159–161° C.

EXAMPLE 10

Using a procedure analogous to that described in Example 2, N - (cis-p-hydroxy-cyclohexyl)-N-methyl - (2-amino-3,5-dibromo-benzyl)-amine was prepared from 2-diacetylamino-3,5 - dibromo-benzyl bromide and cis-p-methylamino-cyclohexanol. Its hydrochloride had a melting point of 208–210° C. (decomposition).

EXAMPLE 11

Using a procedure analogous to that described in Example 4, N-(cis-m-hydroxy-cyclohexyl)-(2-amino-4-chloro-benzyl)-amine was prepared by reducing 2-amino-4-chloro-N(cis-m-hydroxy - cyclohexyl)-benzamide. Its oxalate had a melting point of 217.5–218.5° C. (decomposition).

EXAMPLE 12

Using a procedure analogous to that described in Example 4, N-(trans-p-hydroxy-cyclohexyl)-N-methyl-(2-amino-6-chloro-benzyl)-amine of the formula

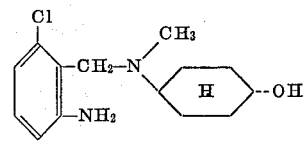

was prepared by reducing 2-amino-6-chloro-N-(trans-p-hydroxy-cyclohexyl)-N-methyl-benzamide. Its dihydrochloride had a melting point of 201–204° C. (decomposition).

The compounds according to the present invention, that is, the free bases embraced by Formula I above, including racemic mixtures thereof, the optical antipodes thereof, diastereomer mixtures and their components, as well as the non-toxic, pharmacologically acceptable acid addition salts of any of these, have useful pharmacodynamic properties. More particularly, they favorably influence the peripheral breathing function, and exhibit antipyretic, secretolytic and antitussive activities and very low toxicities in warm-blooded animals, such as cats, rats and rabbits. By "secretolytic" we mean the ability to increase the output of respiratory tract fluid. The compounds of the invention produce a very rapid onset of the secretolytic action and are highly effective mucolytics as well as being very soluble in water.

For pharmaceutical purposes, the compounds of the present invention are administered to warm-blooded animals perorally or parenterally as active ingredient components in customary dosage unit compositions, that is, pharmaceutical compositions in dosage unit form consisting essentially of an inert pharmaceutical carrier and one dosage unit of the active ingredient, such as tablets, coated pills, capsules, wafers, solutions, suspensions, emulsions, syrups, suppositories and the like. One dosage unit of the compounds according to the present invention is from 0.016 to 0.85 mgm./kg. body weight, preferably from 0.065 to 0.35 mgm./kg. body weight.

The following examples illustrates a few dosage unit compositions comprising a compound of the invention as an active ingredient and represent the best mode contemplated of putting the invention to use. The parts are parts by weight unless otherwise specified.

EXAMPLE 13

Syrup

The syrup is cimpounded from the following ingredients:

| | Parts |
|---|---|
| N-(trans-p-hydroxy - cyclohexyl)-(2-amino-3,5-di-bromo-benzyl)-amine | 0.04 |
| Tartaric acid | 0.5 |
| Benzoic acid | 0.2 |
| Ammonium chloride | 0.4 |
| Glycerin | 10.0 |
| Sorbitol | 50.0 |
| Food color | 0.01 |
| Flavoring | 0.25 |
| Ethanol | 10.0 |
| Distilled water, q.s. ad., by vol. | 100.0 |

Compounding procedure

About 45 parts of distilled water were heated to 80° C., and the tartaric acid, the benzoic acid, the benzylamine, the food color and the sorbitol were successively dissolved therein. Thereafter, the glycerin and an aqueous 20% solution of the ammonium chloride were added thereto, the mixture was cooled to room temperature, and then the ethanol and the flavoring were stirred in. The resulting syrup was diluted to the desired volume with additional distilled water and finally filtered. 10 cc. of the finished syrup contained 4 mgm. of the benzylamine compound and, when administered perorally to warm-blooded animals of approximately 60 kg. body weight, produced very effective secretolytic and antitussive actions.

EXAMPLE 14

Drop solution

The solution was compounded from the following ingredients:

| | Parts |
|---|---|
| N-(trans-p-hydroxy - cyclohexyl)-(2-amino-3,5-di-bromo-benzyl)-amine | 0.4 |
| p-Hydroxy-benzoic acid methyl ester | 0.07 |
| p-Hydroxy-benzoic acid propyl ester | 0.03 |
| Polyvinylpyrrolidone | 5.0 |
| Oil of anise | 0.01 |
| Fennel oil | 0.001 |
| Ethanol | 10.0 |
| Distilled water, q.s. ad., by vol. | 100.0 |

Compounding procedure

A sufficient amount of distilled water was heated to 80° C., and the p-hydroxybenzoic acid esters, the polyvinylpyrrolidone and the benzylamine compound were successively dissolved therein. The solution was cooled to room temperature, and then the mixture of the anise oil, fennel oil and ethanol was stirred in. The solution was diluted to the desired volume with additional distilled water and filtered. 1 cc. (about 10 drops) of the solution contained 4 mgm. of the benzylamine compound and, when administered perorally to warm-blooded animals of about 60 kg. body weight, produced very effective secretolytic and antitussive actions.

EXAMPLE 15

Tablets

The tablet composition was compounded from the following ingredients:

| | Parts |
|---|---|
| N-(trans-p-hydroxy - cyclohexyl)-(2-amino-3,5-di-bromo-benzyl)-amine | 4.0 |
| Lactose | 60.0 |
| Potato starch | 41.0 |
| Polyvinylpyrrolidone | 4.0 |
| Magnesium stearate | 1.0 |
| Total | 110.0 |

Compounding procedure

The benzylamine compound was intimately admixed with the lactose and the potato starch, the mixture was moistened with an aqueous 20% solution of the polyvinylpyrrolidone, and the moist mass was forced through a 1 mm.-mesh screen. The resulting moist granulate was dried at 40° C., again passed through the screen and admixed with the magnesium stearate. The finished mixture was pressed into 110 mgm.-tablets with the aid of a conventional tablet-making machine. Each tablet contained 4 mgm. of the benzylamine compound and, when administered perorally to warm-blooded animals of about 60 kg. body weight, produced very effective secretolytic and antitussive actions.

EXAMPLE 16

Coated pills

The tablets obtained in the preceding example were coated by conventional methods with a thin shell of a mixture consisting essentially of talcum and sugar, and the coated tablets were polished with beeswax. Each coated pill weighed approximately 200 mgm. and, when administered to warm-blooded animals as in Example 15, produced the same effects.

EXAMPLE 17

Suppositories

The suppository composition is compounded from the following ingredients:

| | Parts |
|---|---|
| N-(trans-p-hydroxy-cyclohexyl)-(2-amino-3,5-dibromo-benzyl)-amine | 4.0 |
| Cocoa butter | 1696.0 |
| Total | 1700.0 |

Compounding procedure

The cocoa butter was melted, then cooled to 40° C., and the finely pulverized benzylamine compound was stirred in. The mixture was homogenized, cooled to about 35° C. and poured into cooled suppository molds, each holding 1700 mgm. of the mixture. Each suppository contained 4 mgm. of the benzylamine compound and, when administered by the rectal route to warm-blooded animals of about 60 kg. body weight, produced highly effective secretolytic and antitussive actions.

EXAMPLE 18

Hypodermic solution

The solution is compounded from the following ingredients:

| | Parts |
|---|---|
| N-(trans-p-hydroxy-cyclohexyl)-(2-amino-3,5-dibromo-benzyl)-amine | 4.0 |
| Tartaric acid | 2.0 |
| Glucose | 95.0 |
| Distilled water, q.s. ad., by vol. | 2000.0 |

Compounding procedure

A sufficient amount of distilled water was heated to 80° C. and, while stirring, the tartaric acid and the benzylamine compound were dissolved therein. The solution was cooled to room temperature, the glucose was dissolved therein, and the solution was diluted to the desired volume with additional distilled water and then filtered until free from suspended particles. The filtrate was filled into white 2 cc.-ampules, which were then sterilzed for 20 minutes at 120° C. Each ampule contained 4 mgm. of the benzylamine compound and, when administered by hypodermic injection to warm-blooded animals of about 60 kg. body weight, produced very effective secretolytic and antitussive actions.

Although the above dosage unit composition examples illustrates only one specific compound of the invention as as active ingredient, it should be understood that any other benzylamine compound according to the present invention, as defined above, may be substituted for the particular benzylamine compound in Examples 13 through 18. Moreover, the amount of active ingredient in these examples may be varied to achieve the dosage unit range set forth above, and the nature and amounts of the inert carrier components may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. The trans- or cis-isomer of a compound of the formula

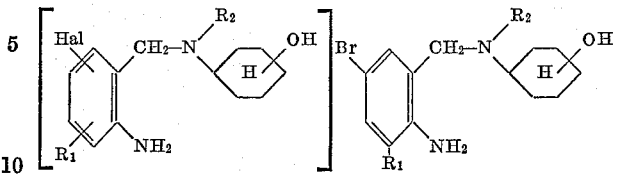

wherein
$R_1$ is hydrogen or bromine, and
$R_2$ is hydrogen or methyl, or a non-toxic, pharmacologically acceptable acid addition salt thereof.

2. The trans-isomer of the compound of claim 1, which is N - (p - hydroxy - cyclohexyl)-(2-amino-3,5-dibromobenzyl)-amine or a non-toxic, pharmacologically acceptable acid addition salt thereof.

3. The trans-isomer of the compound of claim 1, which is N - (p - hydroxy - cyclohexyl)-N-methyl-(2-amino-3,5-dibromo-benzyl)-amine or a non-toxic, pharmacologically acceptable acid addition salt thereof.

4. The trans-isomer of the compound of claim 1, which is N - (m - hydroxy-cyclohexyl)-N-methyl-(2-amino-3,5-dibromo-benzyl)-amine or a non-toxic, pharmacologically acceptable acid addition salt thereof.

5. The cis-isomer of the compound of claim 1, which is N - (m - hydroxy-cyclohexy)-N-methyl-(2-amino-3,5-dibromo-benzyl)-amine or a non-toxic, pharmacologically acceptable acid addition salt thereof.

6. The trans-isomer of a compound of claim 2, which is N - (o - hydroxy-cyclohexyl)-N-methyl-(2-amino-3,5-dibromo-benzyl)-amine or a non-toxic, pharmacologically acceptable acid addition salt thereof.

References Cited

UNITED STATES PATENTS 3,336,308   8/1967   Keck _____ 260—570.9

OTHER REFERENCES

Burger, "Medicinal Chemistry," 2nd ed., p. 75 (1960).

ROBERT V. HINES, Primary Examiner

U.S. Cl. X.R.

260—501.1, 558, 562, 563, 570.9, 574, 575; 424—253, 330